US009528569B2

(12) United States Patent
Sugiura et al.

(10) Patent No.: US 9,528,569 B2
(45) Date of Patent: Dec. 27, 2016

(54) INTERNAL COMBUSTION ENGINE (71) Applicant: HONDA MOTOR CO., LTD., Tokyo (JP)

(72) Inventors: Hiroyuki Sugiura, Wako (JP); Toru Oshita, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 167 days.

(21) Appl. No.: 14/496,785

(22) Filed: Sep. 25, 2014

(65) Prior Publication Data

US 2015/0083068 A1    Mar. 26, 2015

(30) Foreign Application Priority Data

Sep. 26, 2013  (JP) .................. 2013-199150

(51) Int. Cl.
*F02B 75/06* (2006.01)
*F16F 15/26* (2006.01)
*F01M 1/02* (2006.01)
*F02B 67/00* (2006.01)
*F02B 75/20* (2006.01)

(52) U.S. Cl.
CPC .............. *F16F 15/264* (2013.01); *F01M 1/02* (2013.01); F01M 2001/0276 (2013.01); *F02B 67/00* (2013.01); *F02B 75/06* (2013.01); *F02B 75/20* (2013.01); *F16F 15/265* (2013.01)

(58) Field of Classification Search
CPC ........ F16F 15/264; F16F 15/265; F02B 75/20; F02B 75/06; F02B 67/00

USPC ....................................................... 123/192.2
See application file for complete search history.

(56) References Cited

U.S. PATENT DOCUMENTS

| 4,606,310 A | * | 8/1986 | Makino | .................... F02B 61/02 |
| | | | | 123/192.2 |
| 2004/0250789 A1 | * | 12/2004 | Morii | ........................ F01M 1/12 |
| | | | | 123/192.2 |
| 2009/0127800 A1 | * | 5/2009 | Tunnell | .................. F16J 15/062 |
| | | | | 277/591 |
| 2010/0083931 A1 | * | 4/2010 | Ohta | ........................ F01M 1/06 |
| | | | | 123/196 R |

(Continued)

FOREIGN PATENT DOCUMENTS

JP    2009-162202 A    7/2009

*Primary Examiner* — Lindsay Low
*Assistant Examiner* — Charles Brauch
(74) *Attorney, Agent, or Firm* — Birch, Stewart, Kolasch & Birch, LLP (57) ABSTRACT An internal combustion engine includes a crankcase, a case cover for covering a side of the crankcase, a crankshaft and a balancer shaft. A balancer has a balancer driven gear and a balance weight provided on the balancer driven gear and is acted upon and driven by a driving force of the crankshaft to rotate. An oil pump is accommodated in the crankcase and has an oil pump driving shaft disposed in parallel to the crankshaft and the balancer shaft. The oil pump includes a pump driven gear. The balancer has a pump driving gear which has a diameter smaller than that of the balancer driven gear and rotates together with the balancer driven gear. The pump driving gear meshes with the pump driven gear. The oil pump driving shaft is disposed within a range of rotation of the balance weight as viewed in an axial direction thereof.

21 Claims, 7 Drawing Sheets (56) References Cited

U.S. PATENT DOCUMENTS

2010/0250091 A1\*  9/2010  Kawasaki ............... H02P 29/00
                                                701/102
2011/0209680 A1\*  9/2011  Katayama ............... F02B 67/06
                                                123/192.2

\* cited by examiner

INTERNAL COMBUSTION ENGINE

CROSS-REFERENCE TO RELATED APPLICATIONS

The present application claims priority under 35 U.S.C 119 to Japanese Patent Application No. 2013-199150 filed Sep. 26, 2013 the entire contents of which are hereby incorporated by reference.

BACKGROUND OF THE INVENTION

1. Field of the Invention

The present invention relates to an internal combustion engine including a balancer which can make the internal combustion engine compact.

2. Description of Background Art

A conventional structure is disclosed, for example, in Japanese Patent Laid-Open No. 2009-162202 (see, FIGS. 2, 4, and 5). The conventional structure includes a balancer which generates vibromotive force opposite to vibromotive force generated by a piston-crank system of the internal combustion engine to cancel the vibration.

Further, in the internal combustion engine disclosed in Japanese Patent Laid-Open No. 2009-162202, it is indicated that driving force of a balancer shaft is utilized as power for driving auxiliary machines such as an oil pump.

However, in the case of the internal combustion engine disclosed in Japanese Patent Laid-Open No. 2009-162202, a crankshaft, the balancer shaft, and an oil pump driving shaft are disposed in parallel to each other between a left and a right side of a crankcase. Therefore, when an auxiliary machine and some other shaft member are to be disposed, in order to assure necessary space between them, a restriction of space utilization and a disposition relationship to other members cannot be avoided.

SUMMARY AND OBJECTS OF THE INVENTION

Taking the conventional technology described above into consideration, the present invention provides an internal combustion engine including a balancer wherein a balancer shaft and an oil pump driving shaft can be disposed in a neighboring relationship with each other with a space utilization and a disposition relationship to other members to prevented restriction. In addition, the internal combustion engine can be made compact.

In order to solve the problem described above, according to an embodiment of the present invention, an internal combustion engine includes a crankcase, a case cover for covering a side of the crankcase, a crankshaft and a balancer shaft. A balancer having a balancer driven gear and a balance weight is provided on the balancer driven gear. The balancer is acted upon and driven by a driving force of the crankshaft to rotate. An oil pump is accommodated in the crankcase and includes an oil pump driving shaft disposed in parallel to the crankshaft and the balancer shaft. The oil pump includes a pump driven gear. The balancer includes a pump driving gear with a diameter smaller than that of the balancer driven gear and rotates together with the balancer driven gear. The pump driving gear meshes with the pump driven gear. The oil pump driving shaft is disposed within a range of rotation of the balance weight as viewed in an axial direction thereof.

According to an embodiment of the present invention, the balancer is disposed in a space between the crankcase and the case cover. In addition, the balancer shaft is supported by a case side supporting portion formed on a side wall face of the crankcase and a cover side supporting portion formed on an inner side face of the case cover.

According to an embodiment of the present invention, the balancer has the balancer driven gear disposed on the case cover side and the pump driving gear disposed on the crankcase side.

According to an embodiment of the present invention, the balance weight is formed on the opposite outer side faces of the balancer driven gear which is opposed to the case cover.

According to an embodiment of the present invention, the internal combustion engine further includes a restriction member fastened and attached to a side wall face of the crankcase by a fastening member and configured to restrict movement of the oil pump driving shaft in an axial direction. The restriction member and the fastening member are included in the range of rotation of the balance weight as viewed in the axial direction of the oil pump driving shaft.

According to an embodiment of the present invention, the crankcase is configured from divisional upper and lower side halves, and the balancer and the oil pump are disposed on a lower side half of the crankcase while the oil pump driving shaft is disposed below the balancer shaft.

According to an embodiment of the present invention, the internal combustion engine further includes a transmission and a clutch apparatus disposed in a rear of the crankshaft and driven to rotate by the crankshaft. The balancer shaft and the oil pump driving shaft being disposed between the crankshaft and a center shaft of the clutch apparatus in a forward and rearward direction.

According to an embodiment of the present invention, the oil pump is accommodated in an oil pump accommodation chamber defined in the crankcase, and the oil pump driving shaft is configured from a plurality of shaft members including a first shaft portion extending through the inside of the oil pump and a second shaft portion having the pump driven gear engaging with the pump driving gear of the balancer, the first shaft portion and the second shaft portion engaging with and being connected to each other at end portions thereof According to an embodiment of the present invention, the balancer includes the balance weight provided on the balancer driven gear. The pump driving gear, which has a diameter smaller than that of the balancer driven gear and is connected to the balancer driven gear, is provided on the balancer shaft. Further, the pump driven gear on the oil pump driving shaft meshes with the pump driving gear, and the oil pump driving shaft is disposed within the range of rotation of the balance weight. Therefore, the balancer shaft and the oil pump driving shaft can be disposed in the neighboring relationship with each other to make the internal combustion engine compact.

According to an embodiment of the present invention, the balancer shaft is supported by the case side supporting portion formed on the side wall face of the crankcase and the cover side supporting portion formed on the inner side face of the case cover. Therefore, the balancer shaft no longer occupies the space in the crankcase, and the space utilization and the disposition relationship to other members can be prevented from being restricted. Further, the balancer shaft and the oil pump driving shaft can be disposed more closely to each other.

According to an embodiment of the present invention, the balancer driven gear having a greater diameter from between the gears of the balancer is disposed rather near to the case cover side, and the pump driving gear having a diameter smaller than that of the balancer driven gear is disposed rather near to the side wall face of the crankcase. Therefore, the oil pump driving shaft can be disposed more closely to the balancer shaft.

According to an embodiment of the present invention, the balance weight is formed on the opposite outer side faces of the balancer driven gear which is opposed to the case cover. Therefore, the space at the side opposing to the crankcase is no longer occupied by the balance weight, and the oil pump driving shaft can be disposed more closely to the balancer shaft.

According to an embodiment of the present invention, the restriction member that restricts movement of the oil pump driving shaft in the axial direction and the fastening member of the restriction member are disposed so as to be included in the range of rotation of the balance weight. Therefore, parts in the internal combustion engine are disposed intensively and the internal combustion engine can be made compact.

According to an embodiment of the present invention, the oil pump and the balancer are disposed on the lower side half of the crankcase to achieve a lower disposition of the center of gravity. Furthermore, the oil pump driving shaft is disposed below the balancer shaft. Therefore, the oil pump which is a heavy article can be disposed at a lower portion of the internal combustion engine, and the center of gravity of the internal combustion engine can be disposed at a low position.

According to an embodiment of the present invention, the balancer shaft and the oil pump driving shaft are disposed between the crankshaft and the center shaft of the clutch apparatus. Therefore, the oil pump and the balancer which are heavy articles can be disposed rather near to the center of the internal combustion engine in the forward and rearward direction. This contributes to the disposition of the center of gravity of the internal combustion engine rather near to the center of the internal combustion engine in the forward and rearward direction.

According to an embodiment of the present invention, the oil pump driving shaft is formed from the divisional parts. Therefore, the attachment of the oil pump to the inside of the crankcase is facilitated. Further, since the oil pump driving shaft can be extended, the oil pump which is a heavy article can be disposed rather near to the center of the internal combustion engine in the leftward and rightward direction. This contributes to the disposition of the center of gravity of the internal combustion engine rather near to the center of the internal combustion engine in the leftward and rightward direction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
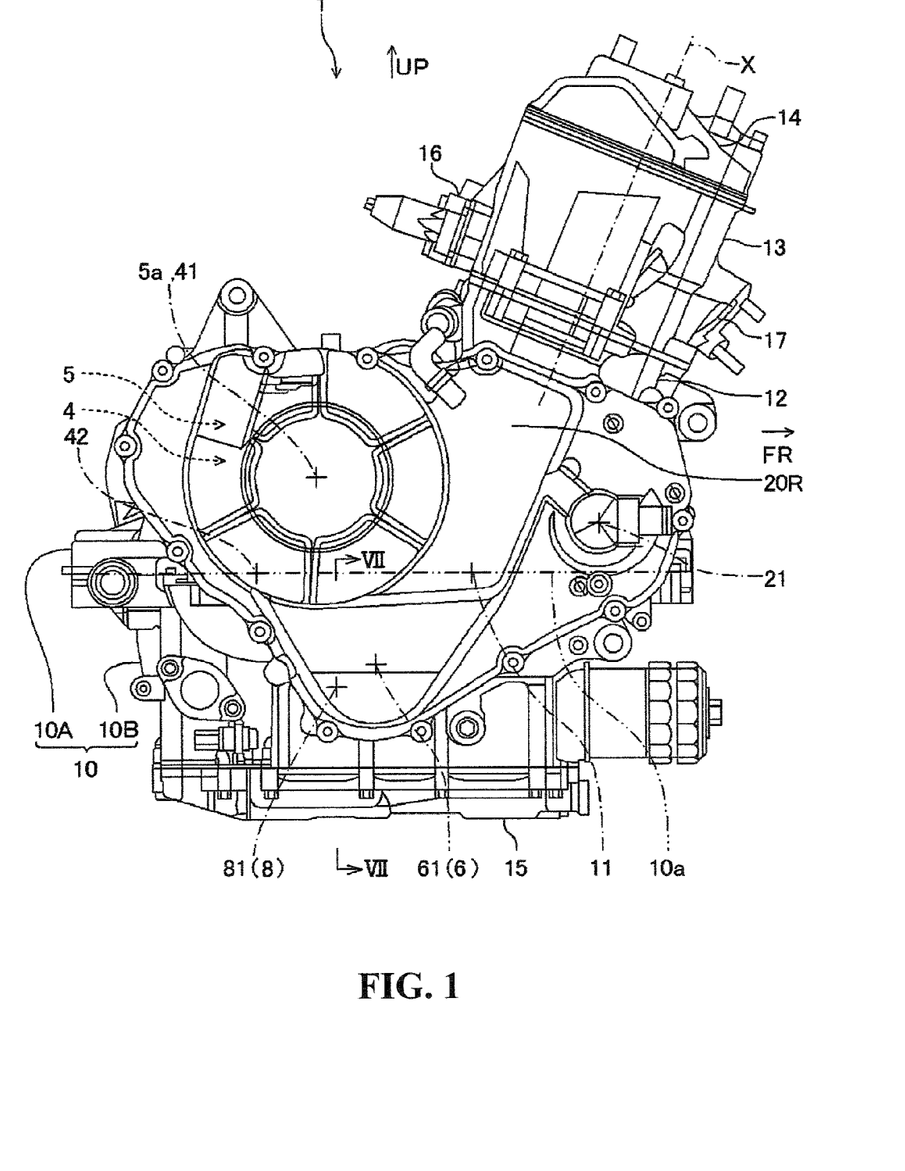
FIG. 1 is a right side elevational view of an internal combustion engine according to an embodiment of the present invention.

FIG. 1 is a right side elevational view of an internal combustion engine 1 according to an embodiment of the present invention. The internal combustion engine 1 is a water-cooled in-line two-cylinder four-stroke cycle internal combustion engine.

Such directions as forward, rearward, leftward, rightward, upward, and downward in the description of the present specification and the claims are represented with reference to the direction of a vehicle not depicted such as, for example, a motorcycle, which is in a posture depicted in FIG. 1 in which the internal combustion engine 1 according to the present embodiment is attached to the vehicle (motorcycle).

In the posture depicted in FIG. 1, the rightward direction in FIG. 1 is the forward direction of the vehicle; the upward direction is the upward direction of the vehicle; a depthwise direction is the leftward direction of the vehicle and a direction to this side of FIG. 1 is the rightward direction of the vehicle.

In FIG. 1, an arrow mark FR denotes the forward direction, LH the leftward direction, RH the rightward direction, and UP the upward direction with reference to the direction of the vehicle.

The internal combustion engine 1 of the present embodiment depicted in FIG. 1 is an internal combustion engine of the type in which a cylinder and a crankcase are integrated. A crankcase 10 supports a crankshaft 11 for rotation thereon so as to extend in a vehicle widthwise direction (leftward and rightward direction). The crankcase 10 is configured from two divisional upper and lower side halves separate upwardly and downwardly across a crankcase parting plane (hereinafter referred to simply as "parting plane") 10a including the center of the crankshaft 11. An upper side half 10A and a lower side half 10B of the crankcase 10 are fastened integrally to each other by bolts along the parting plane 10a.

A cylinder block 12 is provided at an upper portion of the upper side half 10A. The cylinder block 12 is formed as a unitary member and has two cylinder bores arrayed in series.

A cylinder head 13 is placed in order on and fastened to the cylinder block 12 such that a cylinder axis X is inclined rather forwardly. A cylinder head cover 14 is placed on and fastened to the cylinder head 13.

An oil pan 15 is attached under the lower side half 10B.

An intake pipe not depicted is connected to an intake port 16 of and extends rearwardly from a rear portion of the cylinder head 13 of the internal combustion engine 1. The intake pipe extends to an intake system includes a throttle body, an air cleaner and so forth that are not depicted.

An exhaust pipe not depicted is connected to an exhaust pipe 17 of and extends forwardly from a front portion of the cylinder head 13. The exhaust pipe extends to an exhaust system including a muffler and so forth that are not depicted.

The crankshaft 11 is supported for rotation on the crankcase 10 and sandwiched along the parting plane 10a between and by the upper side half 10A and the lower side half 10B. A transmission 4 is disposed behind the crankshaft 11 in the crankcase 10 (refer to FIG. 5).

The transmission 4 is a gear transmission of the constant-mesh type including a main shaft 41 and a countershaft 42. The main shaft 41 of the transmission 4 is supported for rotation on the upper side half 10A at a rear obliquely upper position of the crankshaft 11 such that it extends in parallel to the crankshaft 11.

Figure 2:
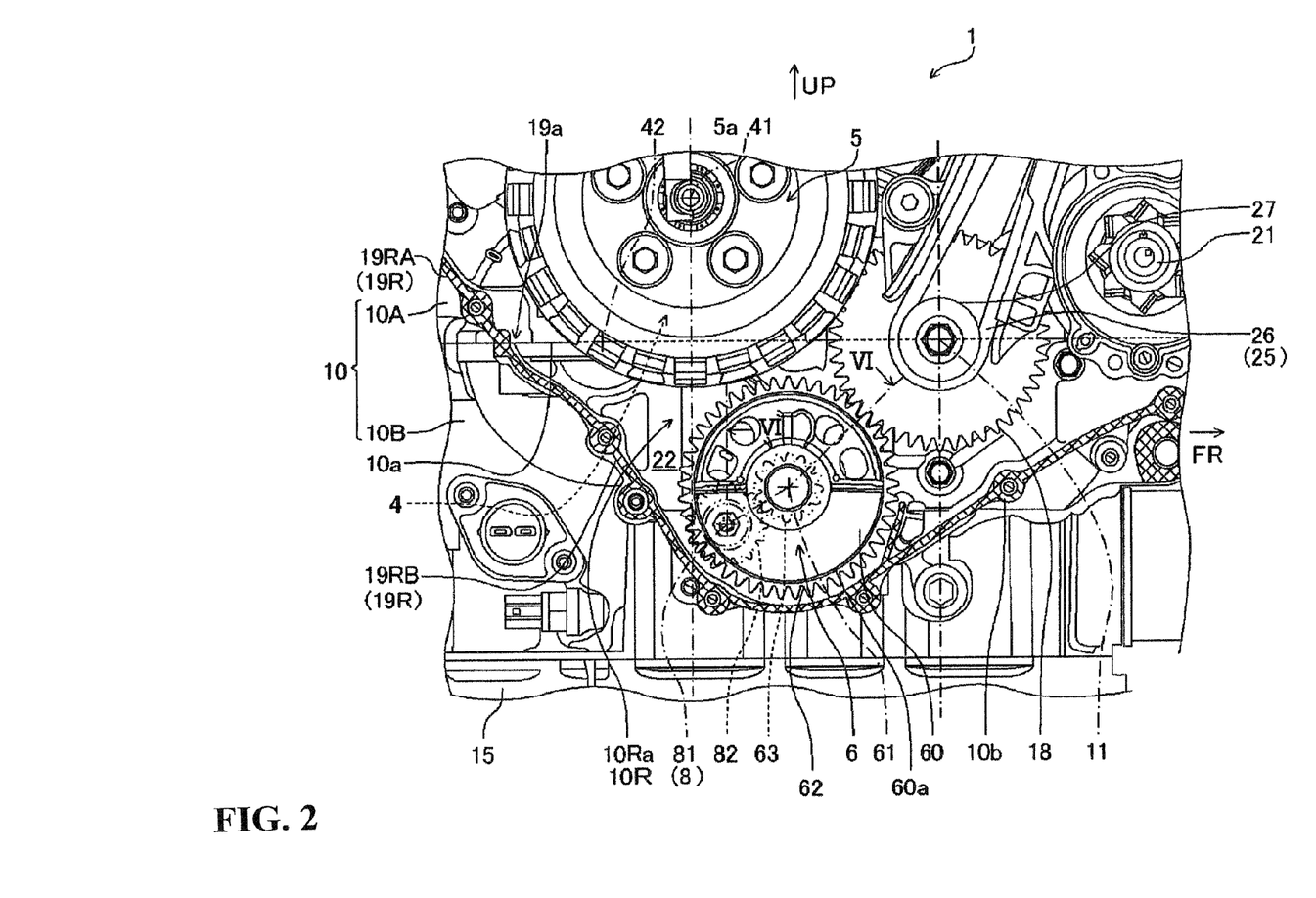
FIG. 2 is an enlarged partial right side elevational view depicting a crankshaft, a balancer and members around them with a right crankcase cover removed in the internal combustion engine depicted in FIG. 1.
Figure 5:
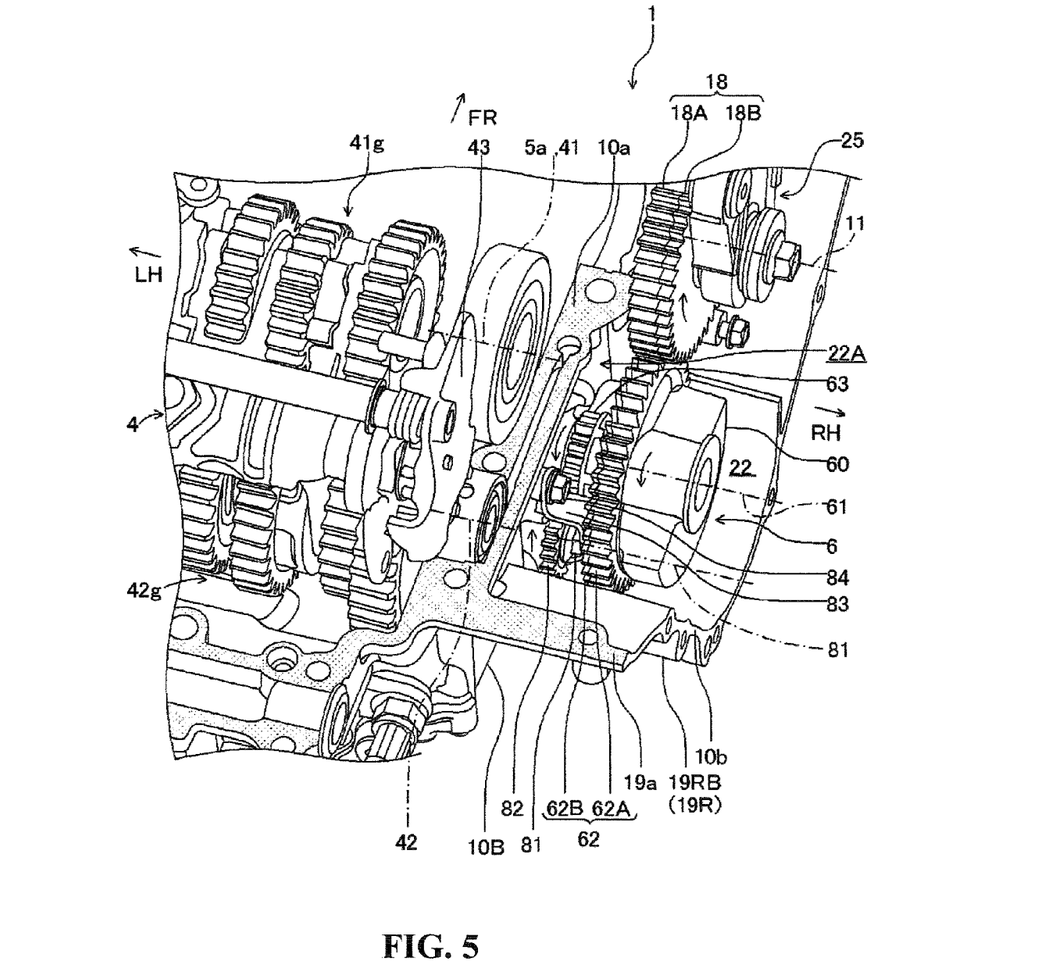
FIG. 5 is a partial perspective view depicting the balancer and members around the same on a lower side half body as viewed in a direction from a rear, right and obliquely upper location with an upper side half body and the right crankcase cover as well as a clutch apparatus removed in the internal combustion engine of the present embodiment.

The countershaft 42 is supported for rotation along the parting plane 10a and sandwiched between the upper side half 10A and the lower side half 10B behind the crankshaft 11 and the main shaft 41 such that it extends in parallel to the crankshaft 11 (refer to FIGS. 2 and 5).

As depicted in FIG. 5, in the transmission 4, paired gears of transmission gear groups 41g and 42g mounted on the main shaft 41 and the countershaft 42, respectively, are held in meshing engagement with each other. Gear changeover is carried out by a speed changing operation mechanism 43 for the transmission 4 to carry out a speed change.

A known multi-plate clutch apparatus 5 not depicted in FIG. 5 is provided at a right end portion of the main shaft 41 such that the right end portion of the main shaft 41 serves as a center shaft 5a of the clutch apparatus 5 (refer to FIG. 2). Rotation of the crankshaft 11 is transmitted to the main shaft 41 through the clutch apparatus 5.

Rotational power of the crankshaft 11 is transmitted to the clutch apparatus 5 through a primary driving gear 18 (refer to FIG. 3) at the crankshaft 11 side and a primary driven gear not depicted at the clutch apparatus 5 side. The clutch apparatus 5 is configured such that, during gear changeover of the transmission 4, it does not transmit the rotational power of the crankshaft 11 to the transmission 4 but transmits, when the gear changeover of the transmission 4 ends, the rotational power of the crankshaft 11 to the transmission 4.

As depicted in FIG. 1, the right side of the crankcase 10 is covered with a right crankcase cover ("case cover" in the present invention) 20R over a great range across the upper side half 10A and the lower side half 10B. The crankshaft 11, a balancer shaft 61, an oil pump driving shaft 81, the center shaft 5a of the clutch apparatus 5 (namely, the main shaft 41), and the countershaft 42 are positioned in order from the front side while they are covered with the right crankcase cover 20R.

It is to be noted that a water pump 21 for cooling water is provided on the right crankcase cover 20R forward of the crankshaft 11.

As depicted in FIG. 2, a right upright wall 19R is formed on a right side wall 10R of the crankcase 10 such that it projects rightwardly across the upper side half 10A and the lower side half 10B. A right end face of the right upright wall 19R serves as a mating face 10b with the right crankcase cover 20R. The right upright wall 19R has an annular shape along an outer edge of the right crankcase cover 20R (refer to FIGS. 1, 4, and 5).

The right upright wall 19R includes an upper side right upright wall 19RA of the upper side half 10A and a lower side upright wall 19RB of the lower side half 10B. When the upper side half 10A and the lower side half 10B are fastened together, also the upper side right upright wall 19RA and the lower side upright wall 19RB are fastened together at the end portions 19a thereof, whereby the annular right upright wall 19R is formed.

It is to be noted that a left upright wall is similarly formed also on a left side wall 10L (refer to FIG. 7) of the crankcase 10. The left upright wall projects leftwardly across the upper side half 10A and the lower side half 10B and has a left end face positioned at a mating plane with the left crankcase cover not depicted. The left upright wall has an annular shape along an outer edge of the left crankcase cover.

As depicted in FIG. 2 in which the right crankcase cover 20R is removed, a right end portion of the crankshaft 11 is positioned on the inner side of the annular right upright wall 19R. The crankshaft 11 extends through and is supported for rotation on the right side wall 10R along the parting plane 10a between the upper side half 10A and the lower side half 10B of the crankcase 10.

The balancer shaft 61 of a balancer 6 and the oil pump driving shaft 81 are positioned on the lower side half 10B. The balancer 6 has a balance weight 60 at a location behind and below the crankshaft 11.

Accordingly, an oil pump 8 and the balancer 6 are disposed on the lower side half 10B of the crankcase 10 to achieve lower disposition of the center of gravity of the internal combustion engine 1.

The main shaft 41 of the transmission 4 is provided in parallel to the crankshaft 11 on the upper side half 10A at a location behind and above the balancer shaft 61 and the oil pump driving shaft 81. A right end of the main shaft 41 extends through and is supported for rotation on the right side wall 10R of the upper side half 10A of the crankcase 10. The clutch apparatus 5 is provided at an end portion of the main shaft 41 such that the center shaft 5a thereof is coaxial with the main shaft 41.

In particular, the clutch apparatus 5 is disposed behind the crankshaft 11 such that it is driven to rotate by the crankshaft 11. The balancer shaft 61 and the oil pump driving shaft 81 are disposed between the crankshaft 11 and the center shaft 5a of the clutch apparatus 5 in the forward and rearward direction.

Accordingly, the oil pump 8 and the balancer 6 which are heavy articles are positioned rather near to the center in the forward and rearward direction, and the center of gravity of the internal combustion engine 1 is positioned rather near to the center in the forward and rearward direction.

The countershaft 42 of the transmission 4 is supported for rotation on the right side wall 10R and the left side wall 10L (refer to FIG. 7) along the parting plane 10a between the upper side half 10A and the lower side half 10B of the crankcase 10 in the rear of the main shaft 41. The countershaft 42 extends rightwardly through the right side wall 10R.

The primary driving gear 18 is fitted at a right end portion of the crankshaft 11 extending through the right side wall 10R. At a further tip end side of the crankshaft 11, a camshaft driving sprocket wheel 27 is fitted (refer to FIG. 5). The camshaft driving sprocket wheel 27 meshes with a cam chain 26 of a chain mechanism 25 which drives a valve system not depicted of the internal combustion engine 1.

Rotational power of the crankshaft 11 is transmitted to the clutch apparatus 5 through the primary driving gear 18 and the primary driven gear that are not depicted attached to the clutch apparatus 5. The primary driving gear 18 includes a so-called scissors structure.

More particularly, as depicted in FIG. 5, the primary driving gear 18 has a two-part structure including a main gear 18A and a sub gear 18B disposed in a gear axial direction thereof. The main gear 18A and the sub gear 18B which has a smaller width are placed on each other in the axial direction and mesh with the primary driven gear not depicted which is the counterpart gear.

The main gear 18A is supported fixedly on the crankshaft 11. Meanwhile, the sub gear 18B is fitted for idling rotation on a boss of the main gear 18A (refer to a boss 62a of a main gear 62A of a balancer driven gear 62 in FIG. 6).

The main gear 18A and the sub gear 18B have an equal diameter and an equal pitch and both mesh with the same gear teeth of the counterpart primary driven gear not depicted. However, a biasing member not depicted is interposed between the main and sub gears 18A and 18B so that the gears 18A and 18B are biased to turn in the opposite directions to each other.

When the primary driving gear 18 drives the primary driven gear to rotate, the main gear 18A and the sub gear 18B of the primary driving gear 18 mesh with the primary driven gear, which is the counterpart gear of the meshing engagement, while the meshing teeth of the primary driven gear are biased away from each other through the meshing teeth of the main gear 18A and the sub gear 18B by the biasing member. Therefore, the backlash between the primary driven gear and the main gear 18A and sub gear 18B is substantially eliminated.

Accordingly, the primary driving gear 18 can mesh with the primary driven gear without a play in the meshing region between them. Therefore, generation of gear noise, vibration and so forth when rotational power is transmitted to the primary driven gear can be prevented.

Figure 6:
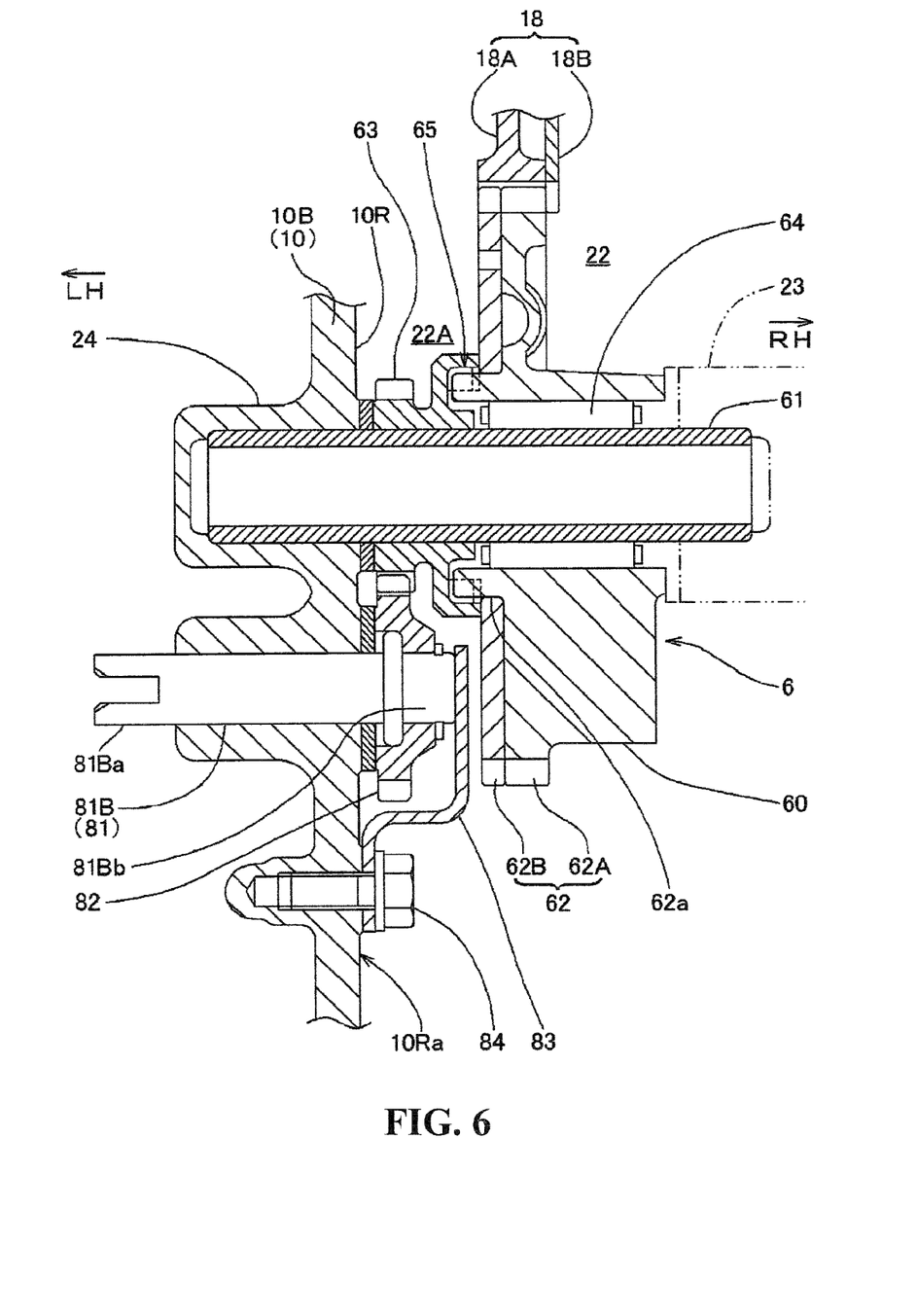
FIG. 6 is a sectional developed view taken along line VI-VI arrowed in FIGS. 2 and 3.

As depicted in FIG. 6, the balancer 6 includes the balancer driven gear 62 with the balance weight 60 thereon that is supported for rotation on the balancer shaft 61 through a needle bearing 64. The balancer driven gear 62 is held in meshing engagement with the main gear 18A of the primary driving gear 18. (It is to be noted that, in FIG. 2, the primary driving gear 18 is depicted at the sub gear 18B side thereof and meshing engagement thereof with the balancer driven gear 62 is not depicted clearly.)

The balance weight 60 is formed on an outer side face of the balancer driven gear 62 opposing to the right crankcase cover 20R. Thus, since the balance weight 60 does not occupy a case side space 22A of a case-cover space 22 opposing to the crankcase 10, the oil pump driving shaft 81 can be disposed in a neighboring relationship with the balancer shaft 61.

On the opposite side of the balancer driven gear 62 to the side face on which the balance weight 60 is provided, a pump driving gear 63 is connected for driven rotation through an Oldham coupling 65. The pump driving gear 63 has a diameter smaller than that of the balancer driven gear 62 and is supported for rotation on the balancer shaft 61. The pump driving gear 63 is held in meshing engagement with a pump driven gear 82 of the oil pump driving shaft 81 (refer to FIG. 2).

The balancer 6 is disposed in the case-cover space 22 between the crankcase 10 and the right crankcase cover 20R.

Figure 4:
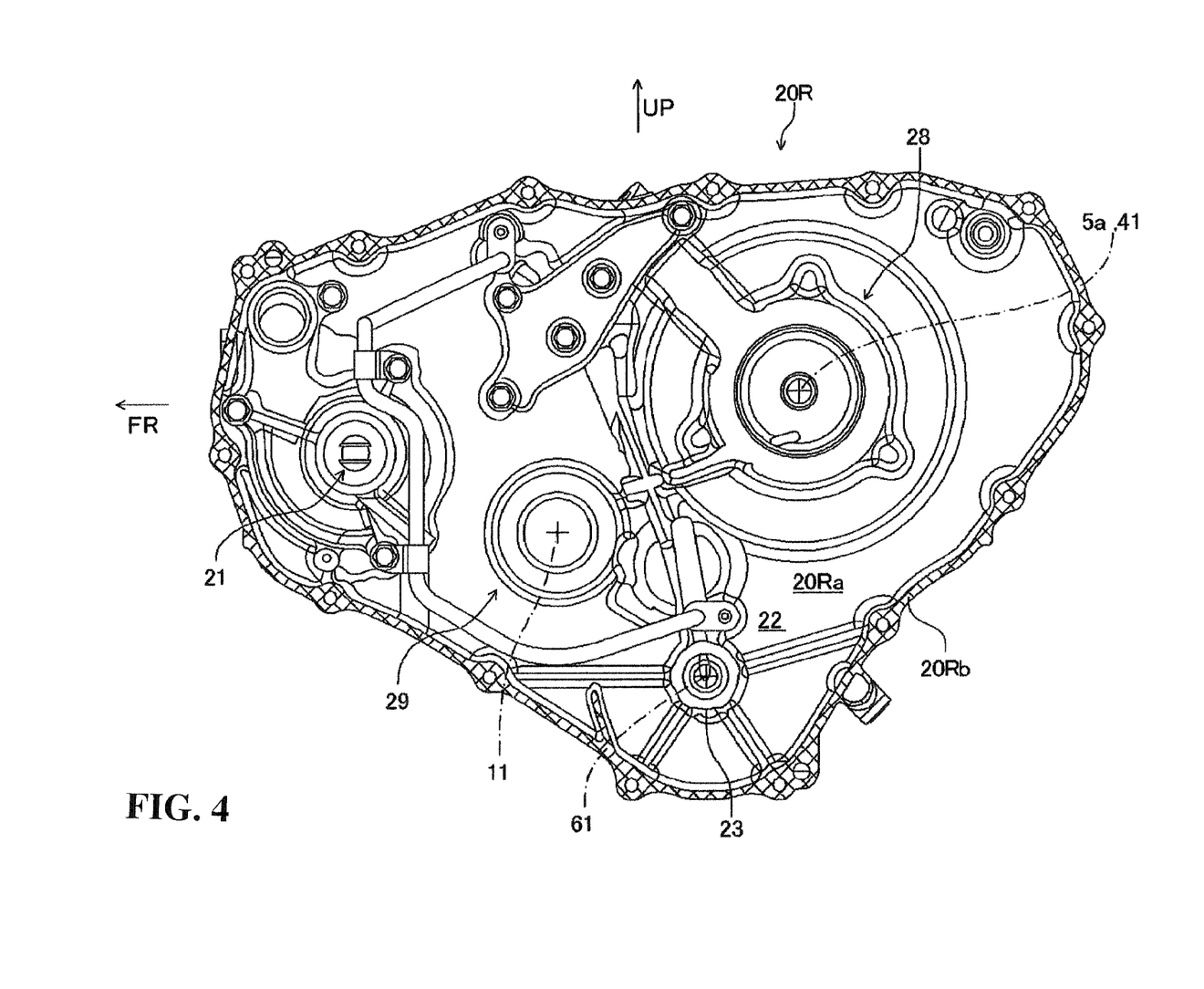
FIG. 4 is a left side elevational view depicting a left inner face of the right crankcase cover depicted in FIG. 1.

More particularly, as depicted in FIG. 4, the right crankcase cover 20R has an inner side face 20Ra which has, on an outer periphery thereof, a cover side mating face 20Rb that coincides with the mating face 10b of a right upright wall 19 of the crankcase 10. The right crankcase cover 20R includes the water pump 21 provided at a front portion thereof and a clutch apparatus cover portion 28 provided at a rear portion thereof. The right crankcase cover 20R further includes a crankshaft end cover portion 29 provided at a substantially central location thereof. A cover side supporting portion 23 is formed at a lower location between the clutch apparatus cover portion 28 and the crankshaft end cover portion 29 in the forward and rearward direction. The cover side supporting portion 23 supports a right end of the balancer shaft 61.

Meanwhile, the balancer shaft 61 is supported at a left end thereof on a case side supporting portion 24 (refer to FIG. 3) formed on the right side wall 10R of the lower side half 10B of the crankcase 10.

Figure 3:
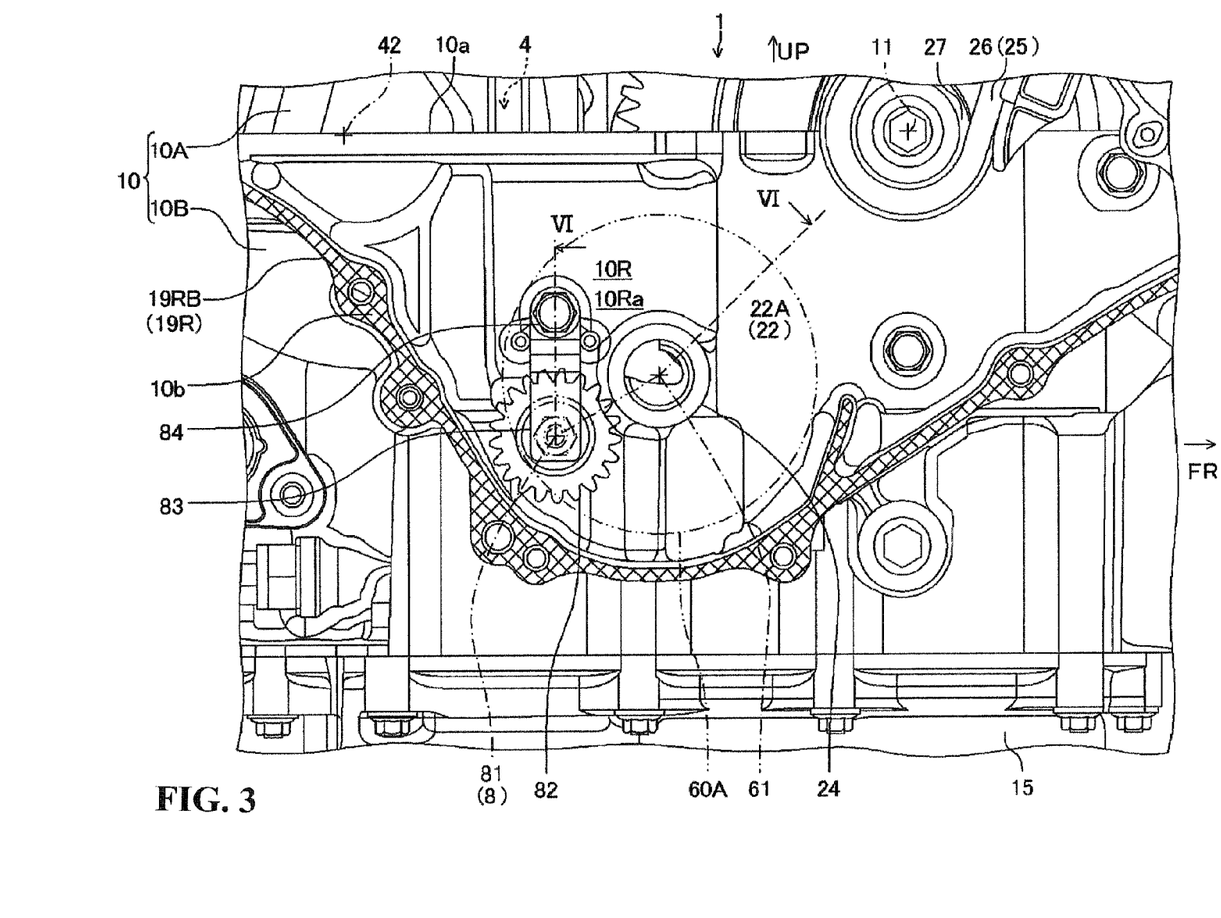
FIG. 3 is an enlarged partial right side elevational view depicting a case side supporting portion for the balancer, a pump driven gear and members around them with the balancer, a primary driving gear, and a clutch apparatus removed in FIG. 2.

Accordingly, the balancer shaft 61 does not occupy the space in the crankcase 10 and can be disposed in the neighboring relationship with the oil pump driving shaft 81.

The balancer driven gear 62 and the pump driving gear 63 of the balancer 6 are disposed such that the balancer driven gear 62 is positioned rather near to the right crankcase cover 20R in the direction of the balancer shaft 61 in the case-cover space 22. The pump driving gear 63 of a smaller diameter is disposed rather near to the face of the right side wall 10R of the crankcase 10.

Accordingly, the pump driven gear 82 of the oil pump driving shaft 81 can be positioned in the proximity of the pump driving gear 63, and the balancer shaft 61 and the oil pump driving shaft 81 can be disposed in the neighboring relationship with each other.

As depicted in FIGS. 5 and 6, also the balancer driven gear 62 of the balancer 6 includes a so-called scissors structure similarly to the primary driving gear 18. In particular, the balancer driven gear 62 has a two-part structure including a main gear 62A and a sub gear 62B in a gear axial direction, and the sub gear 62B is fitted for idling rotation on a boss 62a of the main gear 62A.

The main gear 62A and the sub gear 62B which has a smaller gear width are coaxially placed one on the other in an axial direction. The gears 62A and 62B are biased to turn in the opposite directions to each other and held in meshing engagement with the main gear 18A of the primary driving gear 18 which is the counterpart gear of the meshing engagement.

Although the scissors structure is provided on the driven gear side, also when the main gear 18A of the primary driving gear 18 drives the balancer driven gear 62 of the balancer 6 to rotate, the backlash is similarly substantially eliminated.

Accordingly, since the primary driving gear 18 can mesh with the balancer driven gear 62 without a play in the meshing region therebetween, the generation of gear noise, vibration and so forth when rotational power is transmitted to the balancer driven gear 62 is prevented.

FIG. 3 depicts a state in which the balancer 6, primary driving gear 18, and clutch apparatus 5 are removed from the state depicted in FIG. 2. As illustrated in FIG. 3, the case side supporting portion 24 for the balancer shaft 61 is formed on the right side wall 10R of the lower side half 10B of the crankcase 10. Further, a locus of rotation 60A of an outer periphery 60a (refer to FIG. 2) occurs when the balance weight 60 depicted in FIG. 2 rotates.

The oil pump driving shaft 81 is disposed in parallel to the balancer shaft 61 at a rear lower location of the case side supporting portion 24. The pump driven gear 82 is attached to the oil pump driving shaft 81 and meshes with the pump driving gear 63 of the balancer 6.

More specifically, the balancer 6 and the oil pump 8 are disposed on the lower side half of the crankcase 10, and the balancer shaft 61 is disposed lower than the crankshaft 11. The oil pump driving shaft 81 is disposed lower than the balancer shaft 61. The balancer shaft 61 and the oil pump driving shaft 81 are disposed between the crankshaft 11 and the center shaft 5*a* of the clutch apparatus 5 located behind the crankshaft 11 (refer to FIG. 2).

Accordingly, the oil pump 8 and the balancer 6 which are heavy articles are disposed at a low location. Consequently, the center of gravity of the internal combustion engine 1 is lowered and can be placed near to the center in the forward and rearward direction.

Figure 7:
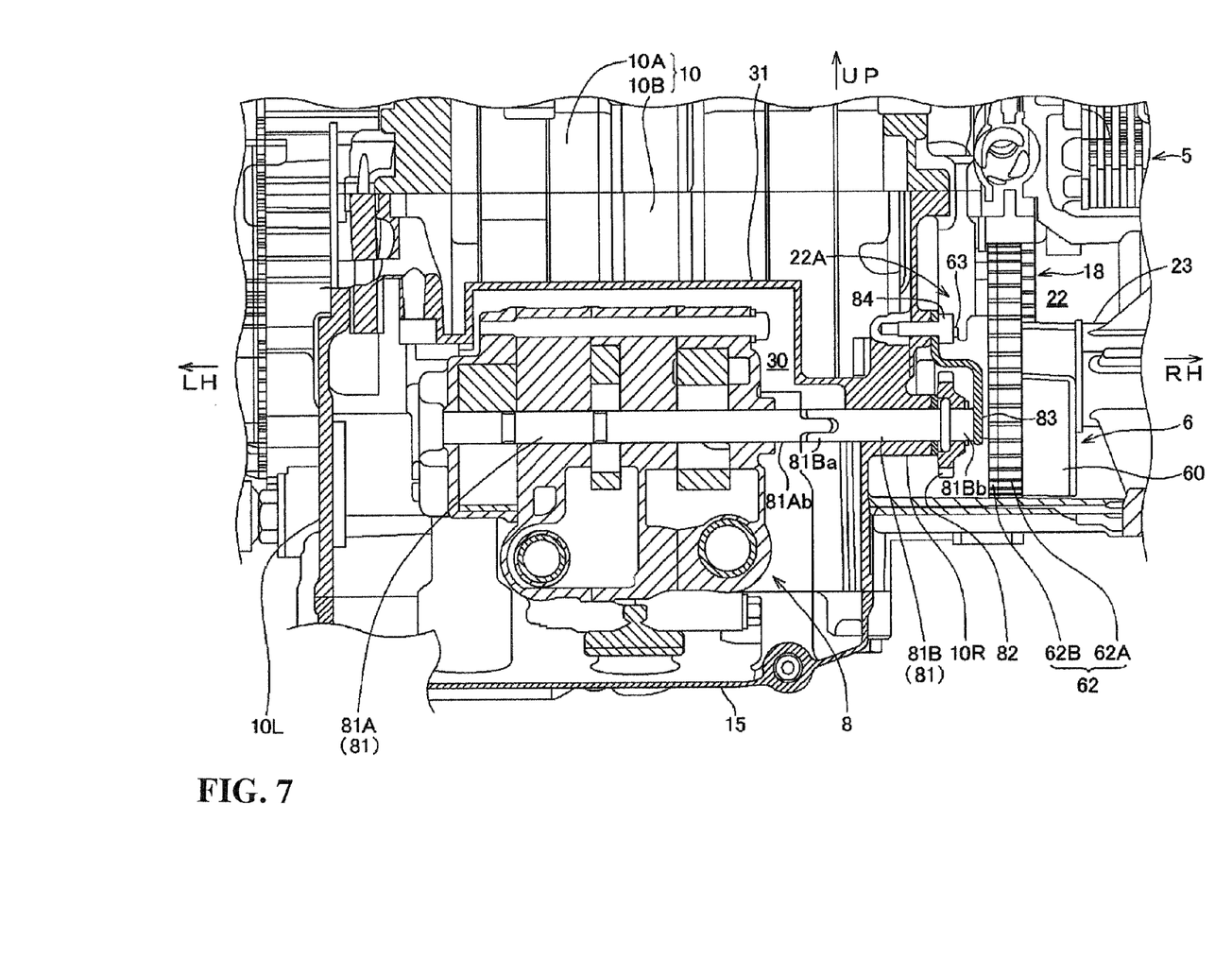
FIG. 7 is a vertical sectional view taken along line VII-VII arrowed in FIG. 1.

As depicted in FIG. 7, the oil pump 8 is accommodated and attached in an oil pump accommodation chamber 30. The oil pump accommodation chamber 30 is defined by an oil chamber partition 31 in the inside of a lower portion between the left side wall 10L and the right side wall 10R of the lower side half 10B of the crankcase 10. The oil pump accommodation chamber 30 is communicated at a lower portion thereof with the inside of the oil pan 15.

The oil pump driving shaft 81 extends in parallel to the balancer shaft 61 and includes a first shaft portion 81A and a second shaft portion 81B formed as separate members from each other. The first shaft portion 81A extends through the inside of the oil pump 8. The second shaft portion 81B has the pump driven gear 82 which engages with the pump driving gear 63 of the balancer 6. A right end portion 81Ab of the first shaft portion 81A and a left end portion 81Ba of the second shaft portion 81B engage with and are connected to each other. A right end portion 81Bb of the second shaft portion 81B extends through the right side wall 10R of the lower side half 10B and is supported for rotation on the right side wall 10R (refer to FIG. 6).

A restriction member 83 contacts with a right end of the oil pump driving shaft 81, namely, with the right end portion 81Bb of the second shaft portion 81B. The restriction member 83 restricts rightward movement of the oil pump driving shaft 81 in the axial direction. The restriction member 83 is fastened to a side wall face 10Ra of the right side wall 10R of the crankcase 10 by a fastening member 84 (refer to FIGS. 3, 5, and 6).

Accordingly, rightward movement of the second shaft portion 81B of the oil pump driving shaft 81 in the axial direction is restricted by the restriction member 83. Meanwhile, leftward movement of the second shaft portion 81 B of the oil pump driving shaft 81 in the axial direction is restricted by engagement of the second shaft portion 81B with the first shaft portion 81A whose movement in the axial direction is restricted in the main body of the oil pump 8.

It is to be noted that the restriction member 83 and the fastening member 84 are positioned such that they are included in a range of rotation of the balance weight 60 (within the locus 60A of rotation) as viewed in the axial direction of the oil pump driving shaft 81 as depicted in FIG. 3. Therefore, parts in the internal combustion engine 1 are disposed intensively, and consequently, the internal combustion engine 1 can be made compact.

As described above, the oil pump 8 which is a heavy article is accommodated in the oil pump accommodation chamber 30 provided between the left side wall 10L and the right side wall 10R of the lower side half 10B of the crankcase 10. Therefore, the oil pump 8 can be disposed rather near to the center of the internal combustion engine 1 in the leftward and rightward direction, and the center of gravity of the internal combustion engine 1 can be positioned rather near to the center in the leftward and rightward direction.

Further, since the oil pump driving shaft 81 is configured from divisional parts thereof, the oil pump 8 can be attached readily in the inside of the oil pump accommodation chamber 30 of the crankcase 10.

Characteristics of such an internal combustion engine of the present embodiment are summarized in the following.

In particular, the internal combustion engine 1 of the present embodiment includes a crankcase 10, a right crankcase cover 20R which covers a right side of the crankcase 10, a crankshaft 11 and a balancer shaft 61 with a balancer 6 having a balancer driven gear 62 and a balance weight 60 provided on the balancer driven gear 62. The balancer 6 is acted upon and driven by a driving force of the crankshaft 11 to rotate. An oil pump 8 is accommodated in the crankcase 10 and includes an oil pump driving shaft 81 disposed in parallel to the crankshaft 11 and the balancer shaft 61. The oil pump 8 includes a pump driven gear 82.

Further, the balancer 6 includes a pump driving gear 63 which has a diameter smaller than that of the balancer driven gear 62 and rotates together with the balancer driven gear 62, and the pump driving gear 63 meshes with the pump driven gear 82. Furthermore, the oil pump driving shaft 81 is disposed within a range of rotation of the balance weight 60 as viewed in an axial direction thereof.

Therefore, the balancer shaft 61 and the oil pump driving shaft 81 can be disposed in the neighboring relationship with each other to make the internal combustion engine 1 compact.

Further, the balancer 6 is disposed in a case-cover space 22 between the crankcase 10 and the right crankcase cover 20R. Further, the balancer shaft 61 is supported by a case side supporting portion 24 formed on a side wall face 10Ra of a right side wall 10R of the crankcase 10 and a cover side supporting portion 23 formed on an inner side face 20Ra of the right crankcase cover 20R.

Therefore, the balancer shaft 61 no longer occupies space in the crankcase 10, and a space utilization and a dispositional relationship to other members can be prevented from being restricted. Further, the balancer shaft 61 and the oil pump driving shaft 81 can be disposed more closely to each other.

Further, the balancer 6 has the balancer driven gear 62 disposed on the right crankcase cover 20R side and the pump driving gear 63 disposed on the crankcase 10 side. Therefore, the balancer driven gear 62 having a greater diameter from between the gears of the balancer 6 is disposed rather near to the right crankcase cover 20R side, and the pump driving gear 63 having a diameter smaller than that of the balancer driven gear 62 is disposed rather near to the side wall face 10Ra of the right side wall 10R of the crankcase 10. Consequently, the oil pump driving shaft 81 can be disposed more closely to the balancer shaft 61.

Further, the balance weight 60 is formed on the opposite outer side faces of the balancer driven gear 62 which is opposed to the right crankcase cover 20R. Therefore, the case side space 22A opposing to the crankcase 10 is no longer occupied by the balance weight 60, and the oil pump driving shaft 81 can be disposed more closely to the balancer shaft 61.

Further, the internal combustion engine 1 further includes a restriction member 83 fastened and attached to a side wall face 10Ra of the right side wall 10R of the crankcase 10 by a fastening member 84 and configured to restrict movement of the oil pump driving shaft 81 in an axial direction. Further, the restriction member 83 and the fastening member 84 are included in the range of rotation of the balance weight 60 as viewed in the axial direction of the oil pump driving shaft 81. Therefore, parts in the internal combustion engine 1 are disposed intensively and the internal combustion engine 1 can be made compact.

Further, the crankcase 10 is configured from divisional upper and lower side halves. The balancer 6 and the oil pump 8 are disposed on the lower side half 10B of the crankcase 10 to achieve a lower disposition of the center of gravity while the oil pump driving shaft 81 is disposed below the balancer shaft 61. Therefore, the oil pump 8 which is a heavy part can be disposed at a lower portion of the internal combustion engine 1, and the center of gravity of the internal combustion engine 1 can be disposed at a low position.

The internal combustion engine 1 further includes a transmission 4 and a clutch apparatus 5 disposed in the rear of the crankshaft 11 and driven to rotate by the crankshaft 11. Further, the balancer shaft 61 and the oil pump driving shaft 81 are disposed between the crankshaft 11 and a center shaft 5a of the clutch apparatus 5 in a forward and rearward direction. Therefore, the oil pump 8 and the balancer 6 which are heavy articles can be disposed rather near to the center of the internal combustion engine 1 in the forward and rearward direction. This contributes to the disposition of the center of gravity of the internal combustion engine 1 rather near to the center of the internal combustion engine 1 in the forward and rearward direction.

Further, the oil pump 8 is accommodated in an oil pump accommodation chamber 30 defined in the crankcase 10, and the oil pump driving shaft 81 is configured from a plurality of shaft members including a first shaft portion 81A extending through the inside of the oil pump 8 and a second shaft portion 81B having the pump driven gear 82 engaging with the pump driving gear 63 of the balancer 6. Further, the first shaft portion 81A and the second shaft portion 81B engage with and are connected to each other at right end portion 81Ab and left end portion 81Ba thereof. Therefore, since the oil pump driving shaft 81 is formed from the divisional parts, attachment of the oil pump 8 to the inside of the crankcase 10 is facilitated. Further, since the oil pump driving shaft 81 can be extended, the oil pump 8 which is a heavy article can be disposed rather near to the center of the internal combustion engine 1 in the leftward and rightward direction. This contributes to the disposition of the center of gravity of the internal combustion engine 1 rather near to the center of the internal combustion engine 1 in the leftward and rightward direction.

While the internal combustion engine of the embodiment of the present invention has been described above, the mode of the present invention is not limited to the embodiment described above. It is a matter of course that the present invention can be carried out in various modes without departing from the subject matter of the present invention.

For example, the internal combustion engine of the present invention may be any of various internal combustion engines not only of the vehicle-carried type but also of the stationary type that include an internal combustion engine. In particular, the internal combustion engine is any of an air-cooled type engine and a water-cooled type engine and may have any number of cylinders.

Further, while the balancer driven gear and the balance weight in the embodiment described above are integrated with each other, it is only necessary for the balancer driven gear and the balance weight to rotate integrally with each other. Therefore, the balancer driven gear and the balance weight may be formed as separate members from each other.

Further, although the disposition of the components in the leftward and rightward direction is specified as described in the foregoing description and depicted in the accompanying drawings, the disposition may be reversed in the leftward and rightward direction from that in the embodiment described hereinabove. Also the reverse disposition is included in the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine, comprising:
   a crankcase;
   a case cover for covering a side of the crankcase;
   a crankshaft;
   a balancer including a balancer shaft, a balancer driven gear and a balance weight provided on the balancer driven gear, the balancer being acted upon and driven by a driving force of the crankshaft to rotate;
   an oil pump accommodated in the crankcase and having an oil pump driving shaft disposed in parallel to the crankshaft and the balancer shaft, the oil pump including a pump driven gear; and
   a pump driving gear on the balancer shaft, the pump driving gear having a diameter smaller than the diameter of the balancer driven gear and rotating together with the balancer driven gear, the pump driving gear axially spaced from the balancer driven gear and meshing with the pump driven gear,
   wherein the oil pump driving shaft is disposed within a circle formed by an outer edge of the balance weight during rotation of the balance weight as viewed in an axial direction of the balancer shaft, and
   wherein the balance weight is between the balancer driven gear and the case cover.

2. The internal combustion engine according to claim 1, wherein the balancer is disposed in a space between the crankcase and the case cover, and
   wherein the balancer shaft is supported by a case side supporting portion formed on a side wall face of the crankcase and a cover side supporting portion formed on an inner side face of the case cover.

3. The internal combustion engine according to claim 1, wherein the balancer has the balancer driven gear disposed on the case cover side and the pump driving gear disposed on the crankcase side.

4. The internal combustion engine according to claim 2, wherein the balancer has the balancer driven gear disposed on the case cover side and the pump driving gear disposed on the crankcase side.

5. The internal combustion engine according to claim 1, wherein the balance weight is formed on an opposite outer side faces of the balancer driven gear which is opposed to the case cover.

6. The internal combustion engine according to claim 2, wherein the balance weight is formed on an opposite outer side faces of the balancer driven gear which is opposed to the case cover.

7. The internal combustion engine according to claim 3, wherein the balance weight is formed on an opposite outer side faces of the balancer driven gear which is opposed to the case cover.

8. The internal combustion engine according to claim 1, further comprising:
a restriction member fastened and attached to a side wall face of the crankcase by a fastening member and configured to restrict movement of the oil pump driving shaft in an axial direction, the restriction member and the fastening member being included in the range of rotation of the balance weight as viewed in the axial direction of the oil pump driving shaft.

9. The internal combustion engine according to claim 2, further comprising:
a restriction member fastened and attached to a side wall face of the crankcase by a fastening member and configured to restrict movement of the oil pump driving shaft in an axial direction, the restriction member and the fastening member being included in the range of rotation of the balance weight as viewed in the axial direction of the oil pump driving shaft.

10. The internal combustion engine according to claim 1, wherein the crankcase is configured from divisional upper and lower side halves, and the balancer and the oil pump are disposed on a lower side half of the crankcase while the oil pump driving shaft is disposed below the balancer shaft.

11. The internal combustion engine according to claim 2, wherein the crankcase is configured from divisional upper and lower side halves, and the balancer and the oil pump are disposed on a lower side half of the crankcase while the oil pump driving shaft is disposed below the balancer shaft.

12. The internal combustion engine according to claim 1, further comprising:
a transmission; and
a clutch apparatus disposed in a rear of the crankshaft and driven to rotate by the crankshaft,
wherein the balancer shaft and the oil pump driving shaft being disposed between the crankshaft and a center shaft of the clutch apparatus in a forward and rearward direction.

13. The internal combustion engine according to claim 2, further comprising:
a transmission; and
a clutch apparatus disposed in a rear of the crankshaft and driven to rotate by the crankshaft,
wherein the balancer shaft and the oil pump driving shaft being disposed between the crankshaft and a center shaft of the clutch apparatus in a forward and rearward direction.

14. The internal combustion engine according to claim 1, wherein the oil pump is accommodated in an oil pump accommodation chamber defined in the crankcase, and
wherein the oil pump driving shaft is configured from a plurality of shaft members including a first shaft portion extending through the inside of the oil pump and a second shaft portion having the pump driven gear engaging with the pump driving gear of the balancer, the first shaft portion and the second shaft portion engaging with and being connected to each other at end portions.

15. The internal combustion engine according to claim 2, wherein the oil pump is accommodated in an oil pump accommodation chamber defined in the crankcase, and
wherein the oil pump driving shaft is configured from a plurality of shaft members including a first shaft portion extending through the inside of the oil pump and a second shaft portion having the pump driven gear engaging with the pump driving gear of the balancer, the first shaft portion and the second shaft portion engaging with and being connected to each other at end portions.

16. An internal combustion engine, comprising:
a crankcase;
a case cover for covering a side of the crankcase;
a crankshaft;
a balancer including a balancer shaft, a balancer driven gear and a balance weight provided on the balancer driven gear, the balancer being acted upon and driven by a driving force of the crankshaft to rotate;
an oil pump accommodated in the crankcase and having an oil pump driving shaft disposed in parallel to the crankshaft and the balancer shaft, the oil pump including a pump driven gear; and
a pump driving gear on the balancer shaft, the pump driving gear having a diameter smaller than the diameter of the balancer driven gear and rotating together with the balancer driven gear, the pump driving gear axially spaced from the balancer driven gear and meshing with the pump driven gear,
wherein the oil pump driving shaft is disposed within a of circle formed by an outer edge of the balance weight during rotation of the balance weight as viewed in an axial direction of the balancer shaft,
wherein the crankcase is configured from divisional upper and lower side halves, and the balancer and the oil pump are disposed on a lower side half of the crankcase while the oil pump driving shaft is disposed below the balancer shaft.

17. The internal combustion engine according to claim 16, wherein the balancer is disposed in a space between the crankcase and the case cover, and
wherein the balancer shaft is supported by a case side supporting portion formed on a side wall face of the crankcase and a cover side supporting portion formed on an inner side face of the case cover.

18. The internal combustion engine according to claim 16, wherein the balancer has the balancer driven gear disposed on the case cover side and the pump driving gear disposed on the crankcase side.

19. The internal combustion engine according to claim 16, wherein the balance weight is formed on an opposite outer side faces of the balancer driven gear which is opposed to the case cover.

20. The internal combustion engine according to claim 16, further comprising:
a restriction member fastened and attached to a side wall face of the crankcase by a fastening member and configured to restrict movement of the oil pump driving shaft in an axial direction, the restriction member and the fastening member being included in the range of rotation of the balance weight as viewed in the axial direction of the oil pump driving shaft.

21. An internal combustion engine, comprising:
a crankcase;
a case cover for covering a side of the crankcase;
a crankshaft and a balancer shaft;
a balancer including a balancer driven gear and a balance weight provided on the balancer driven gear, the balancer being acted upon and driven by a driving force of the crankshaft to rotate; and an oil pump accommodated in the crankcase and having an oil pump driving shaft disposed in parallel to the crankshaft and the balancer shaft, the oil pump including a pump driven gear;

wherein the balancer has a pump driving gear having a diameter smaller than the diameter of the balancer driven gear and rotates together with the balancer driven gear, the pump driving gear meshing with the pump driven gear; and the oil pump driving shaft is disposed within a range of rotation of the balance weight as viewed in an axial direction of the balancer shaft, wherein the balancer driven gear overlaps with at least one portion of the pump drive gear or the pump driven gear in the axial direction of the balancer shaft.

* * * * *